Figure 1:
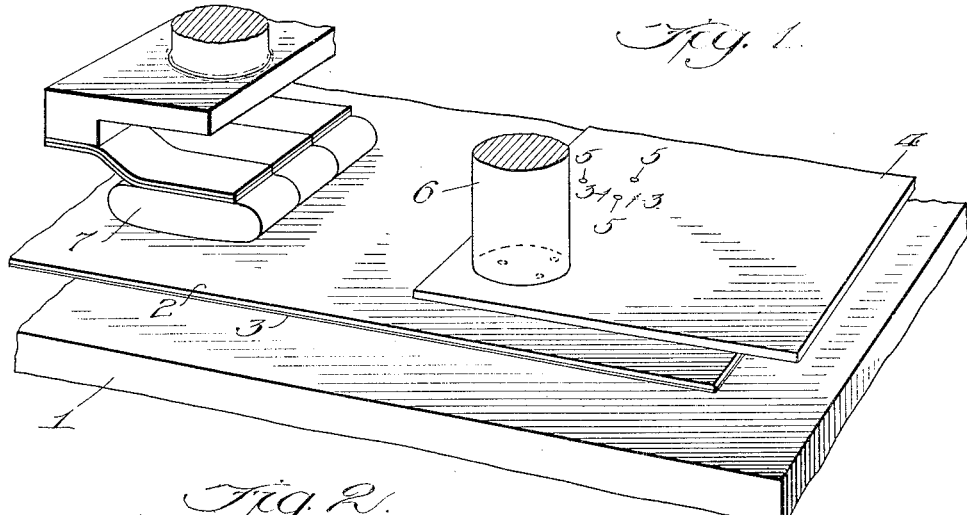

July 20, 1937.   J. A. POTCHEN   2,087,530
METHOD OF WELDING FINISHED METAL SHEETS
Filed March 28, 1936

Inventor:
Joseph A. Potchen,
by Wm. F. Freudenreich,
Atty.

Patented July 20, 1937

2,087,530

UNITED STATES PATENT OFFICE 2,087,530

METHOD OF WELDING FINISHED METAL SHEETS

Joseph A. Potchen, Grand Rapids, Mich., assignor, by mesne assignments, to Reconstruction Finance Corporation, Chicago, Ill., a corporation Application March 26, 1936, Serial No. 71,362

9 Claims. (Cl. 219—10)

For many purposes, where the strength of metal and the decorative effect of wood, combined with lightness and workability, are desired, light sheet steel, faced with thin wood veneer, glued thereto, may be employed to advantage. One of the main problems involved in the use of this material is how to provide simple, easily-made, adequate, concealed fastening means without marring the veneer, without requiring a special process of manufacturing the material, and without requiring the application of fastening elements to the material before the material is completely finished in stock panel form.

Brackets, clamps, or other metal devices may of course be soldered to the exposed rear face of a light steel sheet having on the front side a facing of wood veneer, without injury to the glue joint or discoloration of the wood, provided that the solder has a low melting point; but, while this method permits the compound sheets or panels to be manufactured as simple, flat members which may be handled and shipped in that condition, soldered joints are not altogether satisfactory and cannot be used at all for joints requiring long life, great strength, or ability to withstand high temperatures.

Consequently, for most purposes, it has been necessary to resort to welded joints. However, when it is attempted to weld a metal piece to the metal back of the composite sheet or panel by clamping the whole between the electrodes of a welding apparatus, the result is that the veneer is hopelessly damaged. For this reason the welds have always been made before gluing the veneers to the metal sheets, requiring the development of special shop practices for gluing the wood to metal sheets having attachments thereon. The cost of manufacture of composite panels is thereby raised, difficulties and increased expense in the handling and shipment of the composite panels result, and the field in which such composite material may be commercially utilized is very definitely limited.

The present invention has for its object to produce easily and at a reasonable cost, an effective weld between a metal fastening element and the metal back of a preformed composite sheet or panel comprising a piece of sheet metal and a facing of wood veneer for the latter, without in any way marring the veneer or injuring the glue joint between the veneer and the sheet metal.

I have discovered that I can successfully weld fastenings to the back of a composite sheet by what is known as projection or point welding, in which two metal surfaces to be united are held a short distance apart by an interposed metal spacer or spacers of small cross sectional area. This becomes possible only through carrying out the welding process in such a manner that the heat is confined to the spacing means and the immediately adjacent metal with which the spacing means are in contact, no current is required to pass through the veneer and to an electrode engaged therewith, and no pressure is applied to the veneer in such a way as to mar its surface. All of these conditions may be met by laying the composite panel face down on a table or other flat surface of large area which serves simply as a support, causing the electric current which produces the welding temperature to flow for only a very small fraction of a second through the fastening element and spacers into the metal sheet and back to the source of supply without traversing the veneer; and exerting a proper downward pressure on the fastening device while the current is flowing; the two electrodes both being on the back or upper side of the panel, neither engaging with the veneer. Accordingly, the current enters the back of the metal sheet through the spacers and passes out through the back of the sheet to an electrode engaged therewith and no objectionable heating of the face of the metal next to the veneer or of the veneer takes place.

Since the achievement of successful welding of a part to the back of a steel sheet faced on the front side with wood veneer is due to the control of temperature and pressure conditions at the front side of that sheet, my invention or discovery is not limited in its application to composite sheets of wood and metal. Thus, for example, a fastening element or other part may be welded to the exposed rear face of a steel sheet that is faced with porcelain enamel without injury to the enamel. Also a steel sheet that has on the front side a face that is simply polished, or that is coated with paint or lacquer, or that has a phosphate coating such as produced under the trade names of "Bonderized" or "Parkerized" may have a part welded to the other side without spoiling such finish.

Therefore, viewed in its broadest aspects, the present invention may be said to have for its object successfully to weld an element to one face of a sheet of steel or other metal without altering the appearance of the opposite face or creating conditions harmful to any of the aforesaid finishings on the latter face in the event that the sheet be prefinished.

I am therefore enabled to complete in a flat state, metal sheets having any desired surface finish or coated or sheathed with any desired materials; and, later, either while they remain flat or after a sheet has been bent or worked into one of an infinite number of shapes, depending upon the ultimate use of which it is to be put, to make welded joints therewith without injury to the finish, coating or sheathing on one face thereof.

It may therefore be said that the present invention has for its object very greatly to enlarge the field of usefulness of metal sheets that may be plain, or coated, or sheathed, by providing a simple, inexpensive, and effective method of making a welded joint with one side of the sheet material without affecting the finish, coating or sheathing on the opposite side or face.

Figure 2:
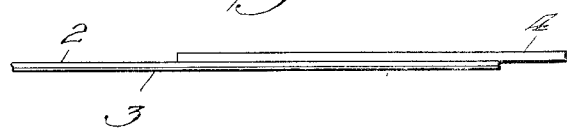
Figure 3:
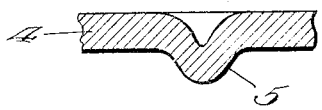
Figure 4:
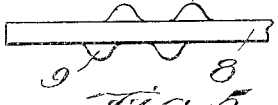
Figure 5:
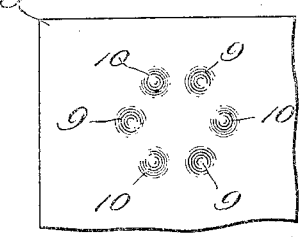

The various features of novelty whereby my invention is characterized will hereinafter be pointed out with particularity in the claims; but, for a full understanding of my invention and of its objects and advantages, reference may be had to the following detailed description taken in connection with the accompanying drawing, wherein:

Figure 1 is a more or less diagrammatic view illustrating my improved process applied to the welding of a plate-like element to the sheet metal member of a piece of sheet metal faced on one side with wood veneer; Fig. 2 is an edge view of the work at the end of the welding operation; Fig. 3 is a section taken on line 3—3 of Fig. 1 and illustrating one of the projections, points or spacers; Figs. 4 and 5 are respectively an edge view and a plan view of a spacing strip adapted to be positioned between two members to be joined; and Fig. 6 comprises a series of curves illustrating the temperature rise in making a weld under different conditions, in the face of the metal sheet directly opposite from a weld.

In the drawing I have illustrated the invention in connection with the welding of a sheet metal element to the rear face or side of a steel sheet faced on the front side with wood veneer and, for the sake of brevity, shall confine the detailed description to this particular application of the invention. It will of course be understood that the example that has been selected is simply one which serves to explain the principle of the invention and is not intended to limit the invention to particular materials, shapes or uses.

Referring to the drawing, 1 represents a table or other member having a flat horizontal top. Upon the member 1 lies a composite sheet or panel, composed of a sheet 2 of steel to one side or face of which is glued a thin wood veneer; the steel being, say, 18 gauge or thinner, while the wood may have a thickness no greater than one hundredth of an inch. 4 is an element of sheet steel which is to be welded to the composite sheet or panel. The sheet or panel is laid on the table, with the wood face down, and the member 4 is positioned on top of the same, supported by the metal sheet 2. The members 2 and 4 are held a short distance apart by small bodies of steel acting as spacers. This may be done in various ways. Where the member 4 is a piece of sheet metal it may be punched at the desired locations, in a manner to produce little projections or points 5 of small cross sectional area. When the member 4 is laid on the panel with the little projections or points on the underside, the projections or points serve as the spacers, whose small cross sectional areas cause them to heat and fuse upon the passage of heavy currents through the same for a small fraction of a second. The projections or spacers are preferably arranged in groups of three, because thereby they form little tripods which stand firmly on the sheet 2 and insure good welding between all of the projections in a limited area, and do not permit tilting of the part 4 and consequent partial fusing of projections outside of that area while a welding operation is being performed.

In making a weld, an electrode of sufficient capacity to carry currents of 10,000 amperes or more is applied to the part 4, a second electrode or terminal is applied to the exposed upper face of the metal sheet 2, and the part 4 is pressed down against the underlying metal sheet by pressure applied to the same just above the point where a weld is to be made. A heavy current is then caused to flow for a small fraction of a second from one electrode to the other, the path of the current including the projections or spacers that are being forced against the underlying metal sheet, and portions of the latter sheet extending between the second electrode and these projections or spacers. This heavy current causes the projections or spacers and the metal in the upper part of the sheet 2 immediately adjacent to the spacers to be heated to a welding temperature and fuse and unite; the pressure on the part 4 forcing the latter down against the underlying panel as the projections or spacers yield upon fusing. After a weld has been made at one point, the pressure on the part 4 is shifted to a point above another group of three projections or spacers, and the operations just described are repeated, making a second weld. After all of the welds have been completed, the element 4 lies flat on the metal member of the composite panel as illustrated in Fig. 2, and is integrally united therewith.

The pressure between the two metal members to be welded together may, if desired, be produced by one of the electrodes. In the drawing, I have shown the electrode 6 that contacts with the element 4 to be large enough in cross sectional area and of such shape that it will cover the three projections or points of a single group. Therefore, if this electrode is positioned over such a group of projections or points and is pressed down, it will force all three of them against the metal sheet 2. The terminal or electrode that engages with the metal sheet 2 preferably makes contact over a large area to prevent freezing of the same to the steel. In the arrangement shown, this electrode is in the form of a series of individual spring pressed shoes 7 which not only cover a large area, but yield individually to adjust themselves to any surface irregularities in the metal sheet 2.

A typical example of commercial practice of my process, involving the welding of pieces of twenty gauge cold rolled steel to metal sheets of twenty-seven gauge galvanealed steel faced with wood veneer having a thickness of about 0.013 of an inch is as follows:

The cold rolled steel is punched to create points or projections approximately 0.015 of an inch high and 0.031 of an inch in diameter spaced apart from each other $\frac{1}{16}$ of an inch in each group of three; the groups being spaced 1½ inches apart from each other. Current is supplied by a 100 kva. transformer at a voltage of 5.5; the resistance of the secondary circuit, exclusive of the parts of the work through which the current flows being about seventy microhms. The downward pressure over the area where a weld is to be made is about 35 pounds. The electrode 6 is about ¾″ in diameter and the shoes 7 are spaced about six inches therefrom. The time that the current is permitted to flow in making each weld is about 1/40 of a second. Apparently it requires a current of at least 3,000 amperes per point or projection to produce even a passable weld, while a good weld is obtained with a current of 5,000 amperes. Upon completion of a whole series of welds there is not only no marring of the veneer apparent, but no evidence that a weld had been made is discernible on the veneer or, upon cutting away the veneer, on the face of the metal next to the veneer. This result is secured without any attendant weakness in the joints, for the weld at each individual point is strong enough to resist shear stresses up to 150 pounds to 200 pounds.

The degree of heating at the surface of the steel sheet on the opposite side of that at which the welds are made, namely the surface to which the wood veneer is glued or other facing or finish applied can easily be determined by laying a steel sheet upon a piece of cloth or other material over which has been spread a powdered substance whose melting point is known. Powders of different melting points may be employed which, by melting over surface areas of different sizes, under similar conditions, permit the extent of heating both as to temperature and surface area to be accurately determined.

Figure 6:
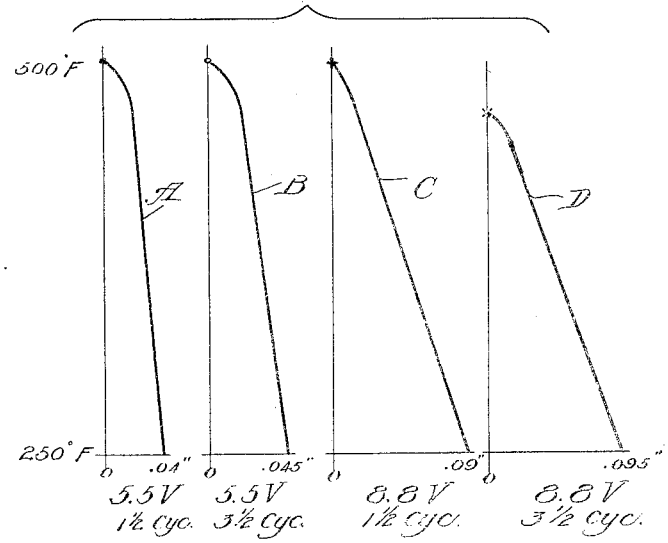

The four curves A, B, C and D, in Fig. 6, indicate the extent of heating at the surface of a steel sheet corresponding to the under face of the sheet 2 in Fig. 1, just opposite a weld, during the making of the latter under four conditions; the readings from which the curves were made having been obtained from tests such as just described. Powdered substances having melting points of about 250° F. to about 500° F. were employed; and current was supplied from a 100 kva. transformer at 5.5 volts and at 8.8 volts for time periods equal to one and one half cycles and three and one half cycles of sixty cycle current. Curve A, representing the results obtained with the lower voltage and the shorter of the two time periods, shows that the temperature of the surface of the sheet steel, opposite the weld, did not rise above about 250° F. over an area having a radius not more than about four one-hundredths of an inch. Increasing the time during which the current flowed caused this area to be increased very slightly, as shown by curve B. Under corresponding conditions, but employing the higher voltage, the heating extended over areas having radii about twice as great, as shown by curves C and D; but even these larger areas are very small, having radii of less than one tenth of an inch.

In no instance was the cloth scorched in making the test welds just described. In fact, by employing thumb pressure opposite the point of making a weld, so that the work is held and pressed together between a thumb on one side and the electrode 6 on the other side, standard welds may be successfully produced without burning the thumb or causing any sensation in the latter except a slight feeling of warmth. This phenomenon is, of course, due to the almost instantaneous dispersion throughout the surrounding mass of cool metal of the small amount of heat that succeeds in passing from the welding zone through the thickness of the metal sheet; the time during which any considerable temperature rise can be maintained being of such extremely short duration that no damage can result therefrom. In other words, when my process is properly carried out, there is no heating of the face of the metal sheet, opposite a weld, that calls for any special care or attention; the slight heating that occurs being of so little consequence that it may be entirely disregarded.

In Figs. 1-3 I have illustrated the points or projections 5 as being integral with one of the two members to be welded together. These elements may, of course, be separate pieces which are properly located between the members to be united. Thus, in Figs. 4 and 5 the points or projections are formed on a steel strip 8, there being two sets; one of which, 9, projects from one face of the strip while the other set 10, projects from the opposite face. Where it is desired to arrange the points or projections in groups, corresponding groups of the two sets are placed one above the other, as shown, so that a single pressure device will exert the proper pressure on all of the points or projections that are to be involved in a single welding operation. In using the device of Figs. 4 and 5, it is placed between two members to be united and the welding is done in the manner heretofore described; the points on both sides of the strip 8 being fused while the strip itself remains intact.

It will thus be evident that I have invented or discovered a simple process that enables me successfully to make welded joints with a metal sheet without marring or otherwise spoiling the appearance of one of its faces or of a finish coating or sheathing upon such face; thereby opening up a wide field for the employment of prefinished sheets or panels consisting of or containing metal sheets in flat or other shapes and in a great variety of structures or constructions.

While I have illustrated and described in detail only a single specific way of carrying out my process, in connection with only a single type of material, I do not desire to be limited to the exact structural details thus illustrated and described; but intend to cover all methods regardless of the materials that are being worked or operated upon, that come within the definition of my invention or discovery constituting the appended claims.

I claim:

1. The method of welding a metal element to a metal sheet, the marring of one face of which through distortion or overheating is to be prevented, which consists in bringing said element and the opposite face of said sheet close to each other and held spaced apart from each other by one or more point-like intervening bodies of metal, pressing said element and said sheet together where the spacer or spacers occur; and causing a very heavy electric current to flow for a small fraction of a second into said sheet through the spacer or spacers and out through the last-mentioned face of the sheet, the current and the time during which it flows being so regulated that the first mentioned face of the sheet does not become overheated in the immediate vicinity of the weld.

2. The method of welding a metal element to a metal sheet, the marring of one of the faces of which through distortion or overheating is to be prevented, which consists in forming on one face of said element one or more small projections, bringing said element and the opposite face of said sheet close to each other and held spaced apart from each other by said projections, pressing said element and said sheet together where a projection or projections occur; and causing a very heavy electric current to flow for a small fraction of a second through a path which includes a part of said element, a projection or projections and portions of said sheet connecting the latter projection or projections with terminal means on the last-mentioned face of the sheet.

3. The method of welding a metal element to a metal sheet, the marring of one of the faces of which through distortion or overheating is to be prevented, which consists in interposing between said element and the opposite face of said sheet spacing means engaged with each other through one or more bodies of metal of small cross sectional areas, pressing said element and said sheet together where the spacing means occurs; and causing a very heavy electric current to flow for a small fraction of a second into said element and to said sheet through one or more of said bodies and then out through the last mentioned face of the sheet, the current and the time during which it flows being so regulated that the first mentioned face of the sheet does not become overheated in the immediate vicinity of the weld.

4. The method of welding a metal element to a metal sheet having on a face a finish, the marring of which through distortion or overheating is to be prevented, which consists in bringing said element and the opposite face of said sheet close to each other and held spaced apart from each other only by one or more point-like intervening bodies of metal, pressing said element and said sheet together where the spacer or spacers occur; and causing a very heavy electric current to flow for a small fraction of a second into said sheet through the spacer or spacers and out through the last mentioned face of the sheet, the current and the time during which it flows being regulated to prevent heating of the first mentioned face of the sheet to a degree that will cause the finish thereon in the immediate vicinity of the weld to be affected.

5. The method of welding a metal element to a metal sheet faced on one side with thin wood veneer, which consists in bringing said element and the opposite face of said sheet close to each other and held spaced apart from each other only by one or more point-like intervening bodies of metal, pressing said element and said sheet together where the spacer or spacers occur; and causing a very heavy electric current to flow for a small fraction of a second into said sheet through the spacer or spacers and out through the last-mentioned face of the sheet, the current and the time during which it flows being so regulated that the wood veneer is not heated sufficiently to discolor it in the immediate vicinity of the weld.

6. The method of welding a metal element to a metal sheet faced on one side with a material, the marring of which through distortion or overheating is to be prevented, which consists in bringing said element and the opposite face of said sheet close to each other and held spaced apart from each other by one or more point-like intervening bodies of metal, pressing said element and said sheet together where the spacer or spacers occur; and causing a very heavy electric current to flow for a small fraction of a second through a path which includes a part of said element, the spacer or spacers, and portions of said sheet connecting said spacer or spacers with terminal means on the last mentioned face of the sheet, the current and the time during which it flows being so regulated that the first mentioned face of the sheet does not become overheated in the immediate vicinity of the weld.

7. The method of welding a steel element to a steel sheet faced on one side with wood veneer, which consists in bringing said element and the opposite face of said sheet close to each other and held spaced apart from each other by one or more point-like intervening bodies of steel, pressing said element and said sheet together where the spacer or spacers occur; engaging a terminal with said element and a second terminal with a large area of the last-mentioned face of said sheet; and causing a very heavy electric current to flow for a small fraction of a second from one terminal to the other through said element, the spacer or spacers, and portions of said sheet that provide an electrically-conductive path between the spacer or spacers and the second terminal.

8. The method of welding a metal element to a thin metal sheet, the marring of one face of which through distortion or overheating is to be prevented, which consists in providing said element with small projections from one face thereof, bringing said element and said sheet together with said projections engaging the face of the sheet opposite the first mentioned face, pressing said element and said sheet together where said projections occur; and causing a very heavy electric current to flow for a small fraction of a second through a path which includes a part of said element, said projections, and portions of the sheet extending from the points of contact of said projections therewith to terminal means engaged with the same face of the sheet as the projections, the current and the time during which it flows being so regulated that the first mentioned face of the sheet does not become distorted or overheated in the vicinity of the weld.

9. The method of welding a metal element to a thin metal sheet, the marring of one face of which through distortion or overheating is to be prevented, which consists in providing said element with small projections from one face thereof, bringing said element and said sheet together with said projections engaging the face of the sheet opposite the first mentioned face, pressing said element and said sheet together where said projections occur; and causing a very heavy electric current to flow for a small fraction of a second through a path which includes a part of said element, said projections, and portions of the sheet extending from the points of contact of said projections therewith to terminal means comprising at least several contact pieces distributed over a considerable area engaged with the same face of the sheet as the projections, the current and the time during which it flows being so regulated that the first mentioned face of the sheet does not become distorted or overheated in the vicinity of the weld.

JOSEPH A. POTCHEN.